US009838491B2

(12) United States Patent
Flores et al.

(10) Patent No.: US 9,838,491 B2
(45) Date of Patent: *Dec. 5, 2017

(54) MONITORING AND CONTROLLING PERCEPTION OF AN ONLINE PROFILE OF A USER

(71) Applicant: International Business Machines Corporation, Armonk, NY (US)

(72) Inventors: Romelia H. Flores, Keller, TX (US); Leonard S. Hand, Red Creek, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,767

(22) Filed: May 22, 2017

(65) Prior Publication Data

US 2017/0289285 A1    Oct. 5, 2017

Related U.S. Application Data

(63) Continuation of application No. 15/251,863, filed on Aug. 30, 2016, which is a continuation of application
(Continued)

(51) Int. Cl.
*G06F 15/177* (2006.01)
*H04L 29/08* (2006.01)
*H04L 12/58* (2006.01)

(52) U.S. Cl.
CPC .............. *H04L 67/22* (2013.01); *H04L 51/16* (2013.01); *H04L 67/306* (2013.01)

(58) Field of Classification Search
None
See application file for complete search history.

(56) References Cited

U.S. PATENT DOCUMENTS 7,890,860 B1 * 2/2011 Thrasher ................. G06F 17/24
707/E17.094
8,756,703 B2    6/2014 Kovacs et al.
(Continued)

OTHER PUBLICATIONS

List of IBM Patents or Patent Applications Treated as Related.
Kleinman, A. "This App Wants to Change Email Forever—by Getting Inside Your Head", Mar. 25, 2015, pp. 1-5, downloaded from http://www.huffingtonpost.com/2015/03/25/crystal-gmail-app_n_6931478.html, Huffington Post, United States.
(Continued)

*Primary Examiner* — Thanh Vu
(74) *Attorney, Agent, or Firm* — Sherman IP LLP; Kenneth L. Sherman; Hemavathy Perumal

(57) ABSTRACT

One embodiment provides a system for monitoring and controlling an online user profile of a user. In response to receiving a data request from the user to access a first web site, the system forwards the data request and desired persona scores to an intelligence service system, receives a list of other web sites from the intelligence service system, and counteracts the user's access to the first web site by spawning multiple threads in accordance with the list received. The multiple threads spawned are transparent to the user. Further, the system alters an original data post submission from the user based on a desired translation option, maps the altered data post submission to a first key, and posts the altered data post submission to a target web site. The original data post submission is viewable only by the user and other users with the first key.

1 Claim, 7 Drawing Sheets

Related U.S. Application Data

No. 15/087,992, filed on Mar. 31, 2016, now Pat. No. 9,485,320.

(56) References Cited

U.S. PATENT DOCUMENTS

| | | | |
|---|---|---|---|
| 9,275,420 B1 | 3/2016 | Fredinburg et al. | |
| 2008/0288597 A1* | 11/2008 | Christensen | H04L 51/12 709/206 |
| 2013/0219296 A1 | 8/2013 | Thazhmon et al. | |
| 2013/0311549 A1 | 11/2013 | Abdulkadev et al. | |
| 2014/0298307 A1 | 10/2014 | Johnson et al. | |
| 2015/0348127 A1 | 12/2015 | Zeng et al. | |
| 2016/0170778 A1* | 6/2016 | Kalyanpur | G06F 9/455 703/22 |

OTHER PUBLICATIONS

Crystal Projects, Inc., Communicate With Anyone, Based on Personality, downloaded Dec. 7, 2015 at https://www.crystalknows.com/, pp. 1-5, Crystal Projects, Inc., United States.

The IBM Watson, "Getting Started With the Message Resonance Service", downloaded Dec. 7, 2015 at https://www.ibm.com/smarterplanet/us/en/ibmwatson/developercloud/doc/mrapi/, pp. 1-2, IBM, United States.

Akkiraju, R., "IBM Watson Tone Analyzer—new service now available", Jul. 16, 2015, pp. 1-13, downloaded from https://developer.ibm.com/watson/blog/2015/07/16/ibm-watson-tone-analyzer-service-experimental-release-announcement/, IBM Watson, United States.

* cited by examiner

MONITORING AND CONTROLLING PERCEPTION OF AN ONLINE PROFILE OF A USER

The present invention generally relates to online user activity, and more particularly, monitoring and controlling perception of an online user profile of a user.

BACKGROUND

In today's interconnected digital world, online users willingly or unwittingly provide direct and/or indirect information about themselves that may be used to informally and/or formally profile themselves. The process of profiling online users based on information provided is commonly referred to as online tracking or behavioral profiling.

Online tracking or behavioral profiling occurs for a multitude of reasons that include, but are not limited to: (1) marketing purposes to provide useful services such as up selling and cross selling, or web site relevance to particular types of visitors, (2) security purposes across all levels (i.e., business, community, nationally, etc.) to facilitate in understanding potential threats and resolve and/or prevent criminal activities, (3) intelligence gathering purposes to facilitate more effective interactions and/or promotions for specific users, and (4) friendly/"echo chamber"/judgment purposes to identify like-minded users and/or make an assessment (e.g., determine an online user's associations, etc.).

SUMMARY

One embodiment provides a system for monitoring and controlling an online user profile of a user. The system comprises at least one processor and a storage device storing instructions that when executed by the at least one processor causes the at least one processor to perform operations including receiving one or more desired persona scores for one or more characteristics associated with an online identity of a user. The operations further include, in response to receiving a data request from the user to access a first web site, forwarding the data request to a target Uniform Resource Identifier (URI) of the first web site, receiving a response from the first web site. forwarding the data request and the one or more desired persona scores to an intelligence service system, receiving a list of other URIs of other web sites from the intelligence service system, and counteracting the access to the first web site by spawning multiple threads in accordance with the list received. The multiple threads spawned are transparent to the user. The operations further include, in response to receiving an original data post submission from the user, receiving a translation option from the user, altering the original data post submission based on the translation option, mapping the altered data post submission to a first key, and posting the altered data post submission to a target web site. The original data post submission is viewable only by the user and other users with the first key.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
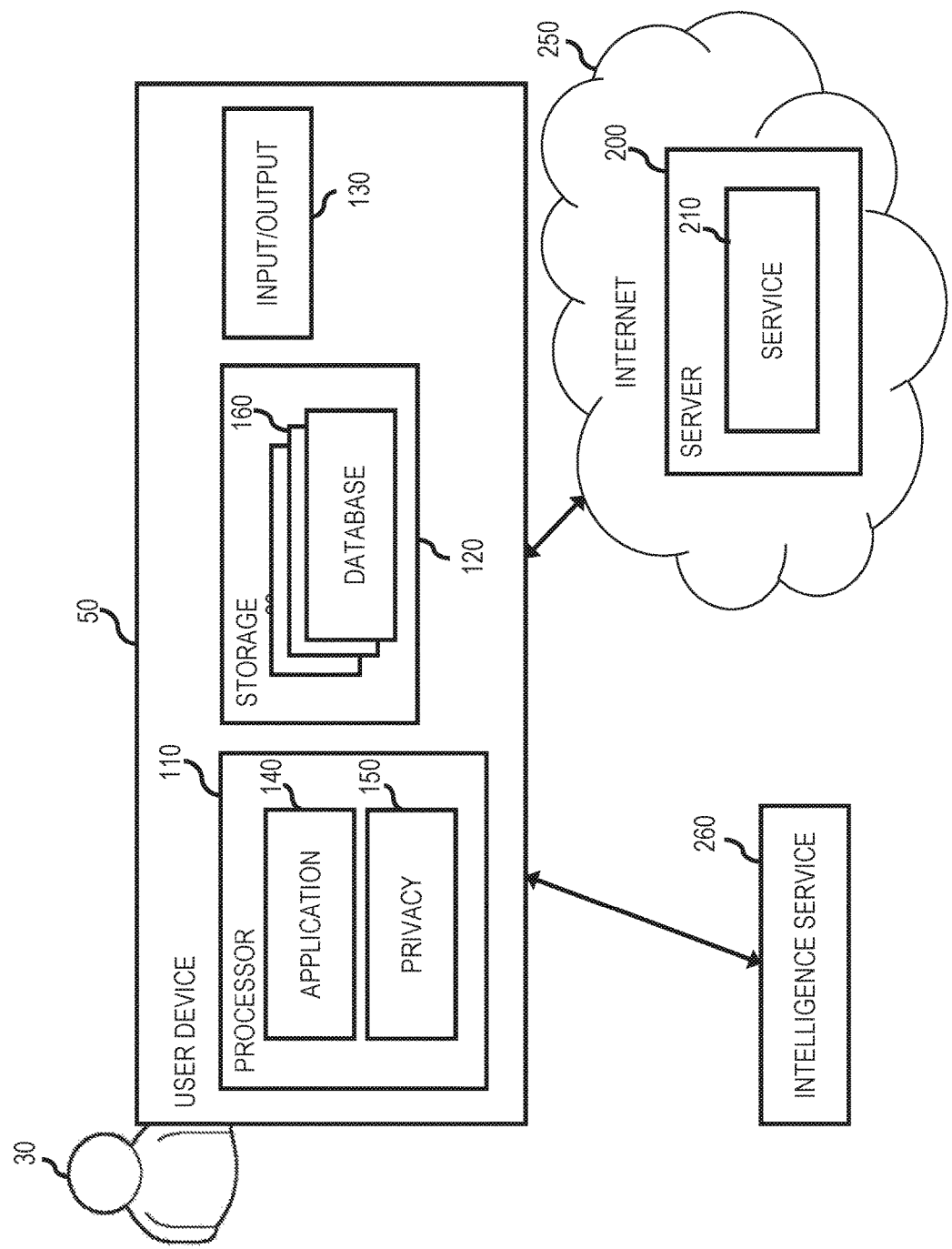
FIG. 1 illustrates an example user device, in accordance with an embodiment of the invention.

The detailed description explains the preferred embodiments of the invention, together with advantages and features, by way of example with reference to the drawings.

DETAILED DESCRIPTION

The present invention generally relates to online user activity, and more particularly, monitoring and controlling perception of an online user profile of a user. One embodiment provides a system for monitoring and controlling an online user profile of a user. The system comprises at least one processor and a storage device storing instructions that when executed by the at least one processor causes the at least one processor to perform operations including receiving one or more desired persona scores for one or more characteristics associated with an online identity of a user. The operations further include, in response to receiving a data request from the user to access a first web site, forwarding the data request to a target Uniform Resource Identifier (URI) of the first web site, receiving a response from the first web site. forwarding the data request and the one or more desired persona scores to an intelligence service system, receiving a list of other URIs of other web sites from the intelligence service system, and counteracting the access to the first web site by spawning multiple threads in accordance with the list received. The multiple threads spawned are transparent to the user. The operations further include, in response to receiving an original data post submission from the user, receiving a translation option from the user, altering the original data post submission based on the translation option, mapping the altered data post submission to a first key, and posting the altered data post submission to a target web site. The original data post submission is viewable only by the user and other users with the first key.

Online users typically do not have any control over how direct and/or indirect information about themselves may be used to informally and/or formally profile themselves. For example, profiling an online user may result in undesired financial impact, political impact or other types of impact on the online user.

Traditional methods of limiting online tracking or behavioral profiling are inefficient. For example, some countries have enacted laws and regulations that attempt to "control" the use of personal information; organizations, however, can easily break/circumvent some of the laws and regulations without repercussions, and an online user may have limited or no say in how the user's personal information is used. As another example, online users may utilize technologies that prevents online profiling or behavioral profiling (e.g., a Tor browser) by providing anonymous or false profiles; users, however, may still unwittingly leave behind information about themselves online. Further, some governments are considering making it illegal to possess false identities online. As yet another example, online users may utilize encryption techniques; there may be instances, however, where an online user does not want to hide his/her identity completely (e.g., quality of service received from a service provider may decrease if identity of the user is completely hidden as there is no personal information to customize the service).

Embodiments of the invention allow an online user to mindfully alter his/her identity profile, as well as customize privacy preferences for the identity profile in different situations/settings, e.g., political, organizational, financial, etc. One embodiment provides multiple ways of hiding/altering an identity profile of an online user based on time of day, location, specific interactions, etc. One embodiment spawns additional traffic for identity balancing. One embodiment allows for altering of content by a service receiver.

FIG. 1 illustrates an example user device 50, in accordance with an embodiment of the invention. The user device 50 comprises one or more processors 110 and one or more storage devices 120. The storage devices 120 maintain one or more databases 160.

In one embodiment, the user device 50 further comprises an input/output interface 130 for receiving input from, and providing output to, a user 30 of the user device 50. The input/output interface 130 may comprise a keyboard, a touch interface, a display, etc.

In one embodiment, the user device 50 is an electronic device, such as a desktop computer, a laptop computer, a tablet, a mobile phone, etc.

One or more processes may execute/operate on the processors 110, such as an application 140 and a privacy engine 150. In one embodiment, the user device 50 includes one or more application 140 that facilitate access to a remote service 210, such as a web browser that facilitates online data requests and/or a mobile application that facilitates online data post submissions (e.g., e-mails, blog posts, posts to social media sites such as Facebook®, Instagram®, Twitter®, etc.). Each remote service 210 runs on one or more remote server devices 200, and is available online on the Internet 250. Each application 140 and the privacy engine 150 exchanges data with one or more remote services 210 over a connection (e.g., a wireless connection, a wired connection, or a combination of the two).

The privacy engine 150 is further configured to exchange data with a remote business intelligence service 260 that continuously crawls the Internet 250 and rates various web sites based on profiles of the web sites and/or content included in the web sites.

The privacy engine 150 is configured to provide the user 30 with online privacy in a public space without encryption, identity masking/hiding, or intermediary automated business rules. As described in detail later herein, the privacy engine 150 allows the user 30 to determine an online persona/identity he/she wishes to display in association with content the user 30 is sending/receiving by obscuring a true identity of the user 30.

Figure 2:
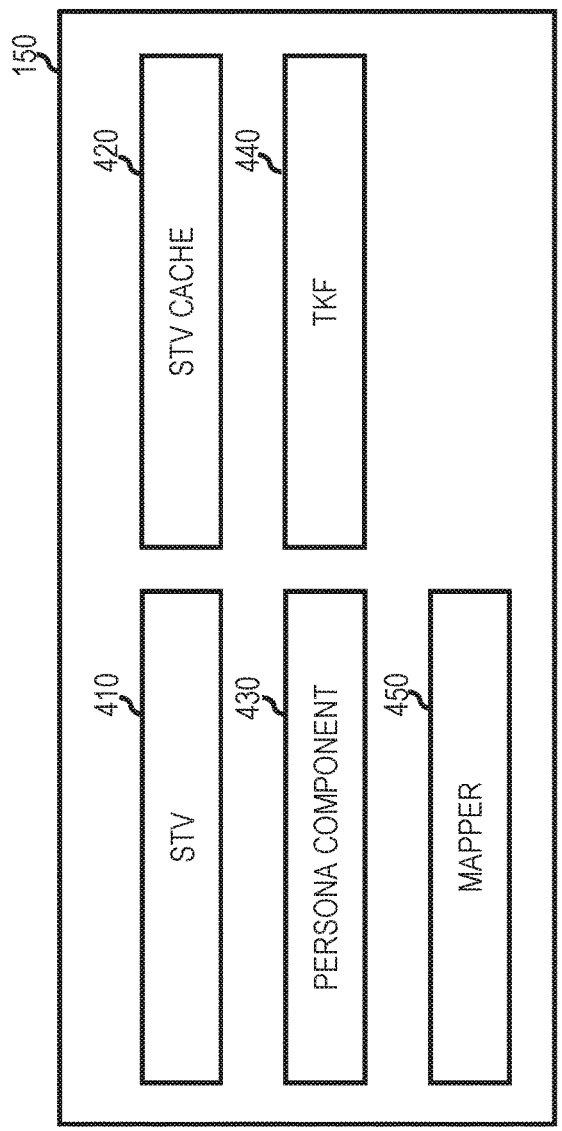
FIG. 2 illustrates an example privacy engine in detail, in accordance with an embodiment of the invention.
Figure 3:
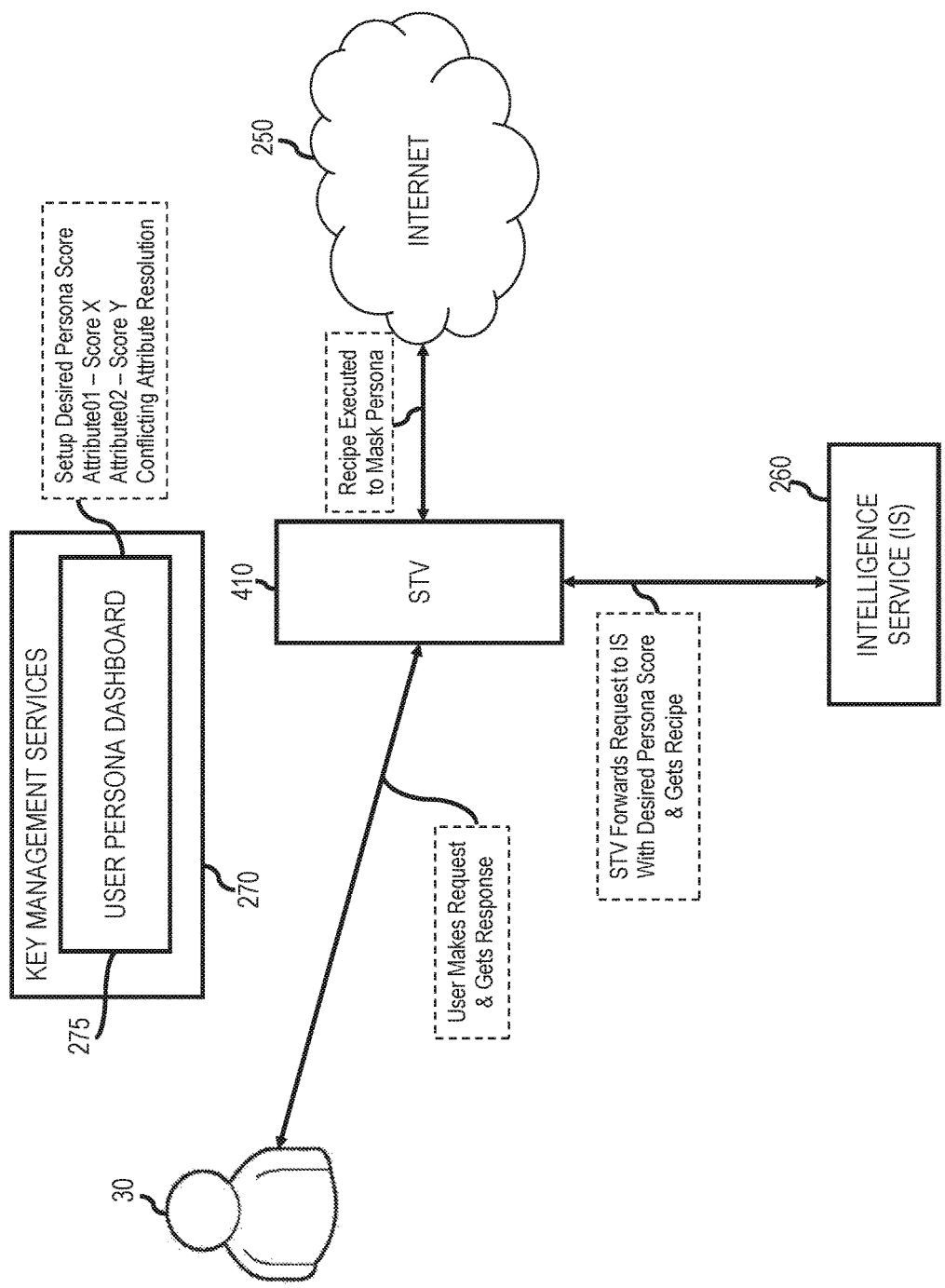
FIG. 3 illustrates an example Security Through Volume (STV) process, in accordance with one embodiment of the invention.

FIG. 2 illustrates an example privacy engine 150 in detail, in accordance with an embodiment of the invention. The privacy engine 150 comprises a persona component 430 configured to generate and display, on the user device 50, a user persona dashboard 275 (FIG. 3). The user persona dashboard 275 allows the user 30 to specify one or more desired persona scores for his/her online persona/identity. Specifically, the user persona dashboard 275 allows the user 30 to specify one or more desired persona scores for controlling amount of information relating to one or more key demographic characteristics/attributes (e.g., age, political affiliation, religious affiliation, financial status, age, gender, etc.) to include in an online persona/identity.

In one embodiment, the user persona dashboard 275 may be included as a tool in a key management services interface 270 (FIG. 3).

In one embodiment, the user persona dashboard 275 includes, for each key demographic characteristic/attribute, a corresponding graphical user interface (GUI) component (e.g., a dial or a slider) that allows the user 30 to select/specify a preferred/desired persona score for the characteristic/attribute. For each key demographic characteristic/attribute, an amount of information associated with the characteristic/attribute that is included in the online persona/identity the user 30 wishes to display is based on a preferred/desired persona score for the characteristic/attribute.

In another embodiment, the user persona dashboard 275 includes one or more tabs, wherein each tab corresponds to a particular key demographic characteristic/attribute. Each tab includes a corresponding GUI component (e.g., a dial or a slider) that allows the user 30 to specify/select a preferred/desired persona score for a corresponding characteristic/attribute.

For a particular key demographic characteristic/attribute, the intelligence service 260 assigns a corresponding score to a Uniform Resource Identifier (URI) of a web site, wherein the score indicates likelihood that the web site is affiliated with the characteristic/attribute. For example, a high score may indicate that the web site is strongly affiliated with the characteristic/attribute, whereas a low score indicates that the web site is unlikely to be affiliated with the characteristic/attribute.

Security Through Volume (STV) represents a process of hiding a particular stream of online traffic that may be used for online profiling or behavioral profiling within other streams of legitimate online traffic. A recipe represents a list of counter-acting URIs to offset/balance a score of a URI requested by a user 30.

The privacy engine 150 further comprises a STV unit 410 configured to: (1) receive a data request from a user 30 to access a first URI, (2) execute the data request by forwarding the data request to the Internet 250, (3) receive a response from the Internet 250, (4) forward the data request and one or more desired persona scores specified by the user 30 to the intelligence service 260, (5) receive a recipe from the intelligence service 260 that is based on the data request and the one or more desired persona scores, and (6) apply STV by executing multiple threads that request data from other web sites specified by the recipe.

The STV unit 410 spawns "additional traffic for balancing online persona/identity of the user 30. For example, assume the user 30 has strong affiliations with a first political group (e.g., a left-leaning political group) but wants to be viewed as a neutral or an independent online to service providers, profilers and data collectors. When the user 30 requests, via a web browser on the user device 50, data from a web site popularly affiliated with the first political group (e.g., a left-leaning website), the STV unit 410 launches multiple threads that request data from other web sites that are neutral/independent or affiliated with a different political group (e.g., independent and/or right-leaning web sites). Rules and depth of navigation depends on the recipe.

Table 1 below provides an example listing of threads spawned by the STV unit 410 in response to a user 30 requesting data from a web site "Site A".

TABLE 1

User Request -------------> Site A (rating of 97)
n threads spawned to cover Site A rating
+------- Thread 001 --> Site B (rating of 45 - depth 6)
+------- Thread 002 --> Site C (rating of 33 - depth 2)
+------- Thread 003 --> Site D (rating of 55 - depth 21)
|
+------- Thread n --> Site Z (rating of 39 - depth 5)

Referring to Table 1, if the intelligence service 260 assigns Site A with a corresponding score of 97/100 for left-leaning politics, the intelligence service 260 returns a list of URIs of web sites with lower scores for left-leaning politics to offset the access to Site A. For example, the STV unit 410 may spawn multiple threads, such as a first thread "Thread 001" to access web site "Site B" with a corresponding score of 45/100 and a corresponding depth of navigation of 6, a second thread "Thread 002" to access web site "Site C" with a corresponding score of 33/100 and a corresponding depth of navigation of 2, a third thread "Thread 003" to access web site "Site D" with a corresponding score of 55/100 and a corresponding depth of navigation of 21, . . . , and an n$^{th}$ thread "Thread n" to access web site "Site Z" with a corresponding rating of 39/100 and a corresponding depth of navigation of 5.

In one embodiment, the privacy engine 150 further comprises a STV cache 420 that maintains cached information relating to web sites previously accessed by the user 30 (e.g., recipes for web sites previously accessed by the user 30).

Translator Key Filtering (TKF) represents a process of identifying/filtering true/original content submitted by a user 30 from a plurality of data using data key mapping.

The privacy engine 150 further comprises a TKF unit 440 for user submitted content, such as data posts to social media sites, blogs, emails and other "permanent" representations of a user 30 that can be trolled or otherwise inspected to collect profile information about a user. The TKF unit 440 provides the user 30 the ability to identify actual information (i.e., true/original content submitted by the user 30) in a space with a key, and only other users with the same key are able to view the actual information. Any user without the key will see instead a plurality of data spawned to balance the online persona/identity of the user 30. In another embodiment, the TKF unit 440 alters a data post submission instead, such that the submission is rendered obtuse to all but key holders.

For example, the TKF unit 440 may translate a data post submission from the user 30 that reads "I hate Noodles" to "I think-too-much-about Noodles". A mapper 450 places "think-too-much-about"/Entry ID in an encrypted map entry as a key; as the entry is unique, the key may be reused.

In one embodiment, the user 30 can select various options of translation to adjust a corresponding score and possible recipe count. For example, for the "I hate Noodles" data post submission, the user 30 may be provided with choices not involving the topic of noodles to render the submission completely obtuse, such as "My Cat is Hungry (with a corresponding score of 40/100) or "I Love Tofu (with a corresponding score of 96/100). STV applied is based on the option of translation selected. The TKF unit 440 combines all aspects of STV with data key mapping.

In one embodiment, the TKF unit 440 may provide the user 30 with a popup Internet view of data to be posted to the Internet 250 (i.e., the true/original content submitted including all other data spawned by STV).

Figure 5:
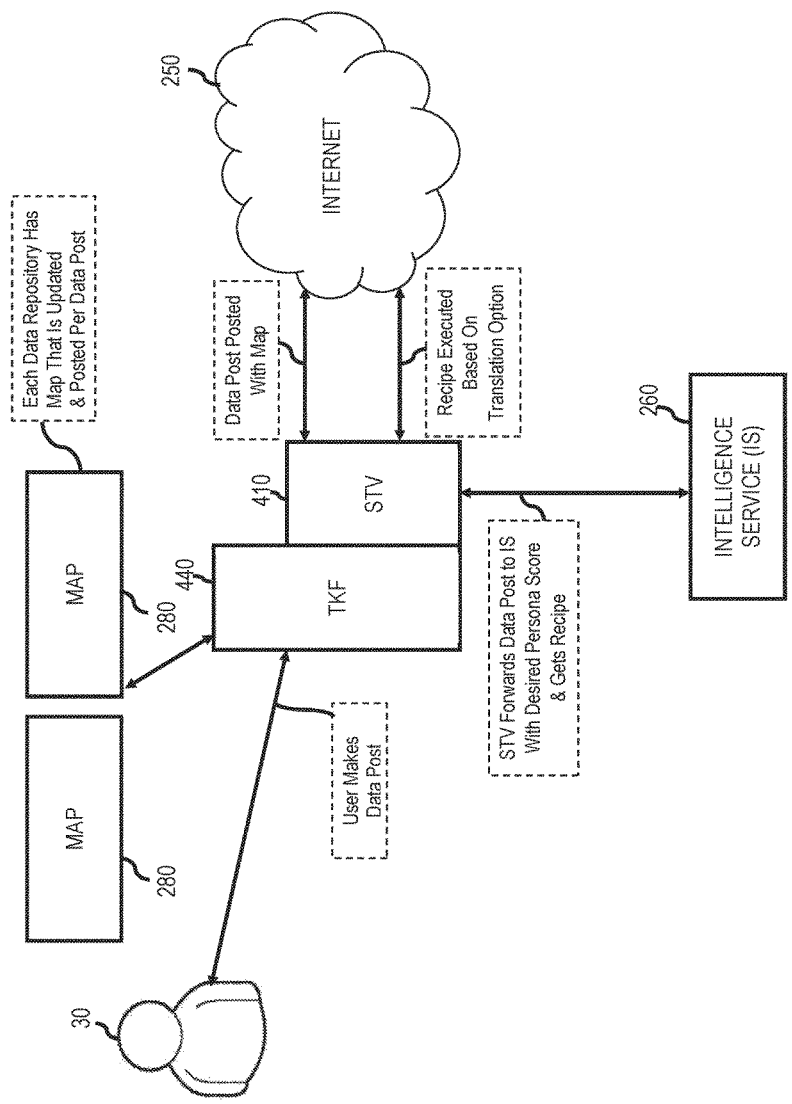
FIG. 5 illustrates an example Translator Key Filtering (TKF) process, in accordance with one embodiment of the invention.

When a user 30 makes a data post submission, the submission is posted to the Internet 250 along with a map 280 (FIG. 5). Each data repository site (e.g., blog, e-mail, social media site) has a corresponding map 280 that is updated and posted per data post submission. Only key holders may view true/original content in the site. An actual entry that is updated in the site is mapped as valid, and additional entries are added via STV if required for the obscurity. A new map 280 is stored and updated on the site itself. When a user with a key accesses the site, one of the following may occur: (1) actual information (i.e., true/original content submitted by the user 30) and other data spawned by STV is displayed, but the actual information is highlighted via an indicator, (2) actual information (i.e., true/original content submitted by the user 30) and other data spawned by STV is displayed, but the actual information is highlighted via an indicator and the other data spawned by STV is greyed, and (3) only actual information (i.e., true/original content submitted by the user 30) is displayed.

Embodiments of the invention allow users to be themselves without revealing themselves. Users can identify with a group to receive solicitations that are marked for that group, and users are also free to be themselves without fear of hyper-political correctness and the consequences of such. Users can share data with friends in a public space without being profiled by the provider of that space.

Figure 4:
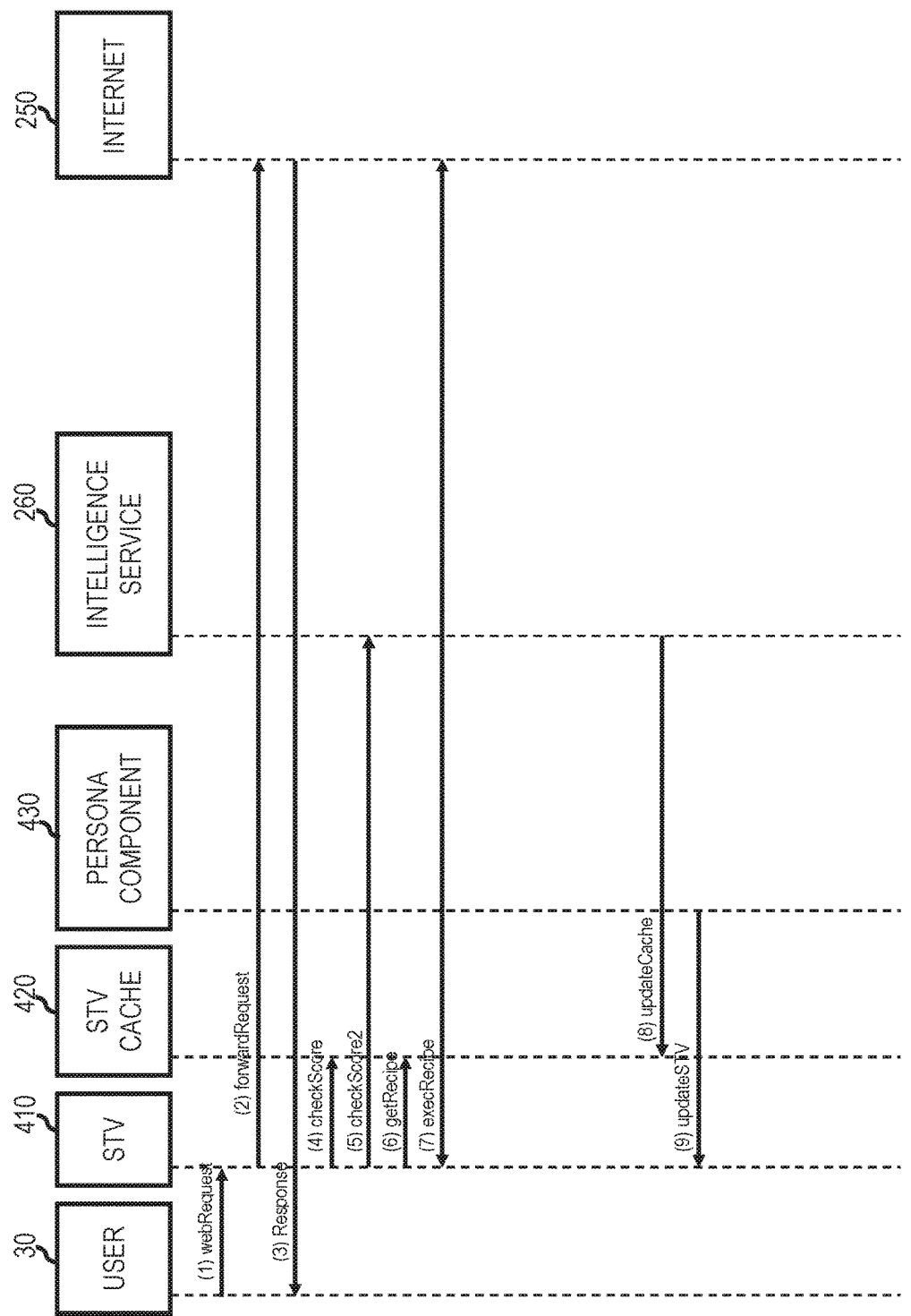
FIG. 4 is an example flowchart of the STV process in FIG. 3, in accordance with one embodiment of the invention.

FIG. 3 illustrates an example STV process, in accordance with one embodiment of the invention. FIG. 4 is an example flowchart of the STV process in FIG. 3, in accordance with one embodiment of the invention. Table 2 below provides a step-by-step guide of the STV process in FIGS. 3-4.

TABLE 2

| (1) webRequest | Step 1: User makes a data request typically via a web browser |
|---|---|
| (2) forwardRequest | Step 2: The request as is flows to a target URI |
| (3) Response | Step 3: The user gets a response from the target URI |
| (4) checkScore | Step 4: STV unit checks score for the target URI in the STV cache |
| (5) checkScore2 | Step 5: If the STV cache does not have a current score for the target URI, the STV reaches out to the intelligence service via an encrypted connection |
| (6) getRecipe | Step 6: STV unit gets a recipe from the STV cache |
| (7) execRecipe | Step 7: STV unit spawn offs a thread to execute the recipe. A recipe may have time delays to ensure plausible results. The spawning of multiple threads in accordance with the recipe is transparent to the user. |

TABLE 2-continued

| | |
|---|---|
| (8) updateCache | Step 8: The intelligence service updates the STV cache with updated scores of likely URIs to be accessed by the user as well as recipes for counter-acting the scores. |
| (8) updateSTV | Step 9: The persona component will apply updates to the STV unit anytime desired persona scores changes. |

Figure 6:
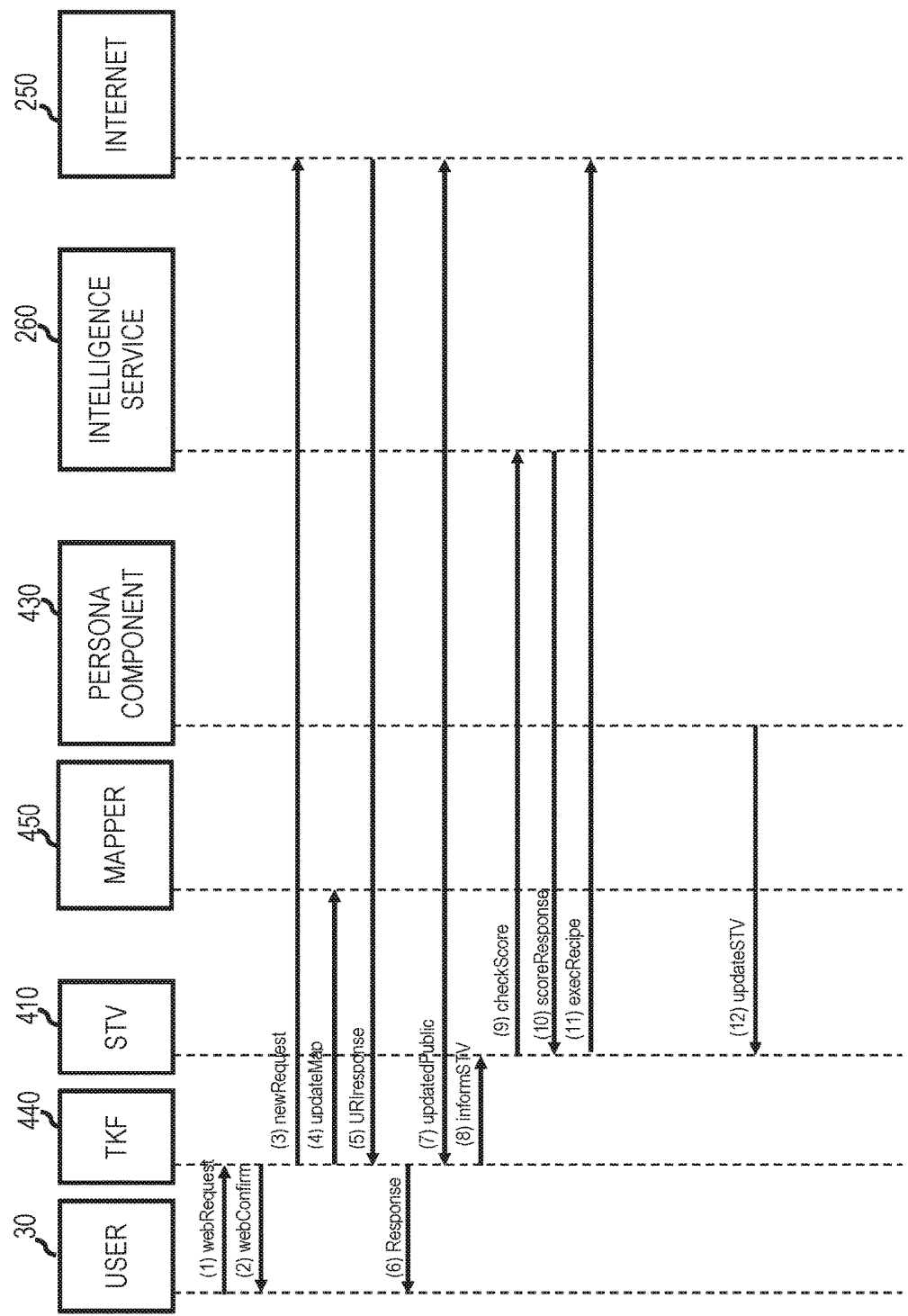
FIG. 6 is an example flowchart of the TKF process in FIG. 5, in accordance with one embodiment of the invention.

FIG. 5 illustrates an example TKF process, in accordance with one embodiment of the invention. FIG. 6 is an example flowchart of the TKF process in FIG. 5, in accordance with one embodiment of the invention. Table 3 below provides a step-by-step guide of the TKF process in FIGS. 5-6.

TABLE 3

| | |
|---|---|
| (1) webRequest | Step 1: User makes a data post submission typically via a web browser |
| (2) webConfirm | Step 2: The TKF unit responds to the user with an optional confirmation (e.g., a choice of appearance posts are presented for the user to select) |
| (3) newRequest | Step 3: The TKF unit forwards updated/altered data post submission to target URI |
| (4) updateMap | Step 4: The TKF unit updates mapping and keeps mapper open to perform response translations |
| (5) URIresponse | Step 5: Target URI send back response |
| (6) response | Step 6: The TKF unit translates the response and presents to the user |
| (7) updatePublic | Step 7: The TKF unit updates a public map such that those with a key can also perform translations |
| (8) informSTV | Step 8: The TKF unit informs the STV unit of the submission so the STV unit can temper the submission if necessary |
| (9) checkScore | Step 9: STV unit contacts the intelligence service to get a score and recipe if needed to counter weight the score |
| (10) scoreResponse | Step 10: STV unit gets a recipe (if needed) |
| (11) execRecipe | Step 11: STV unit executes the recipe |
| (12) updateSTV | Step 11: The persona component will apply updates to the STV anytime it changes such that it can score accurately |

Figure 7:
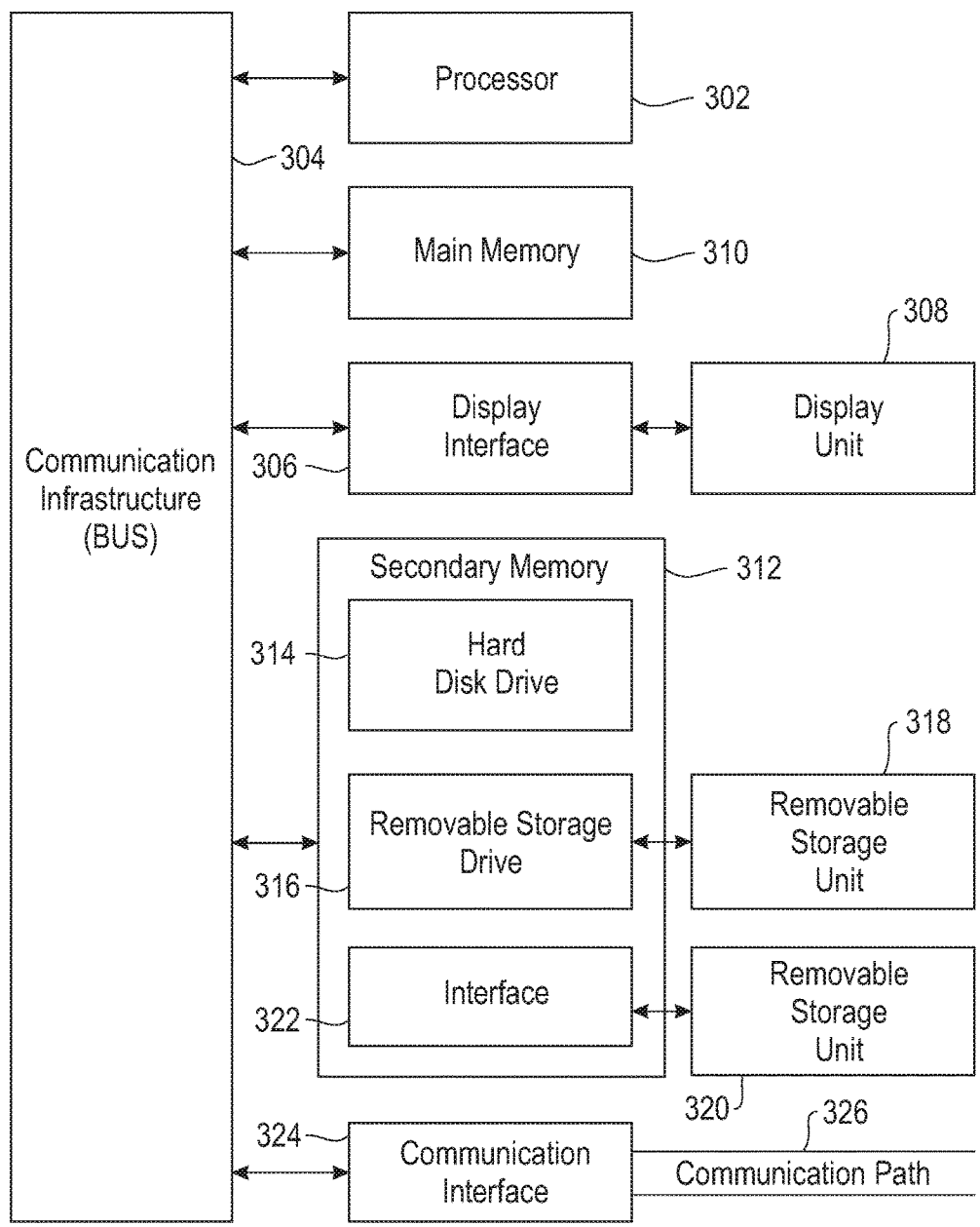
FIG. 7 is a high level block diagram showing an information processing system useful for implementing an embodiment of the present invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for monitoring and controlling an online profile of a user, the computer program product comprising a computer readable storage medium having program instructions embodied therewith, the program instructions executable by a processor to cause the processor to:
   receive a desired persona score for a characteristic associated with an online identity of a user;
   in response to receiving a data request from the user to access a first web site:
      forward the data request to a target Uniform Resource Identifier (URI) of the first web site;
      receive a response from the first web site;
      forward the data request and the desired persona score to an intelligence service system;
      receive a list of other URIs of other web sites from the intelligence service system; and
      counteract the access to the first web site by spawning multiple threads in accordance with the list received, wherein the multiple threads spawned are transparent to the user; and
   in response to receiving an original data post submission from the user:
      receive a translation option from the user;
      alter the original data post submission based on the translation option;
      map the altered data post submission to a first key; and
      post the altered data post submission to a target web site, wherein the original data post submission is viewable only by the user and other users with the first key.

* * * * *